United States Patent

Saneto et al.

[11] Patent Number: 5,158,627
[45] Date of Patent: Oct. 27, 1992

[54] RUN FLAT PNEUMATIC RADIAL TIRE

[75] Inventors: Kazuyoshi Saneto, Hadano; Akinori Tokieda, Fujisawa; Kunihiko Kakigi, Atsugi; Hiroaki Matsuzaki, Kawasaki, all of Japan

[73] Assignee: The Yokohama Rubber Co., Ltd., Tokyo, Japan

[21] Appl. No.: 722,448

[22] Filed: Jun. 27, 1991

[30] Foreign Application Priority Data

Jun. 28, 1990 [JP] Japan .................. 2-168450

[51] Int. Cl.$^5$ .............................................. B60C 17/00
[52] U.S. Cl. ...................................... 152/510; 152/517
[58] Field of Search ............. 152/510, 517, 516, 521, 152/522, 504–507

[56] References Cited

U.S. PATENT DOCUMENTS

| | | | |
|---|---|---|---|
| 3,954,131 | 5/1976 | Hoshino et al. | 152/517 |
| 4,140,167 | 2/1979 | Böhm et al. | 152/505 |
| 4,549,593 | 10/1985 | Yahagi et al. | 152/510 |

Primary Examiner—Geoffrey L. Knable
Attorney, Agent, or Firm—Nikaido, Marmelstein, Murray & Oram

[57] ABSTRACT

A run flat pneumatic radial tire having a flatness of 50% or less, comprising a reinforcing liner layer comprised of a high-hardness rubber having a crescent cross section disposed on the inside of a side wall portion and an inner liner layer comprising a rubber composition mainly composed of a butyl rubber provided all over the internal surface of the tire, wherein the inside of the inner liner layer in at least a region covering said reinforcing liner layer is covered with a rubber layer comprising a rubber composition mainly composed of a diene rubber having a polybutadiene rubber content of 50% by weight or more based on the rubber component.

10 Claims, 1 Drawing Sheet

RUN FLAT PNEUMATIC RADIAL TIRE

BACKGROUND OF THE INVENTION

The present invention relates to a run flat pneumatic radial tire and more particularly to a pneumatic radial tire having an improved durability in run flat traveling.

A run flat pneumatic tire is a tire constructed so that the tire can continue traveling a certain distance even after the internal pressure is decreased due to occurrence of puncture. In the conventional run flat pneumatic tire, the rigidity of the side wall portion is increased as high as possible to render the tire difficult to bend, thereby imparting a run flat performance to the tire.

From the viewpoint of the fact that the lower the flatness of the tire, the easier the increase in the rigidity of the side wall portion to render the tire difficult to bend, Japanese patent application Kokai Publication No. 64-30809 proposes a run flat pneumatic tire wherein a reinforcing liner comprising a high-hardness rubber and having a crescent cross section is disposed on the inside of the side wall portion of a tire having a flatness of 55% or less in such a manner that the upper end and the lower end of the reinforcing liner overlap with a belt layer and a bead filler, respectively. In the above, described run flat pneumatic tire having a small flatness, however, since the height of the side wall portion is small, a flex strain is locally increased in a region from around the upper end of a rim flange to around the end of a belt edge, so that cracks tend to occur in an inner liner layer covering the inside of the reinforcing layer and mainly composed of a butyl rubber. Further, the durability in run flat traveling is unfavorably reduced because the insides of the inner liner layer are rubbed against each other during flexing to bring about an abrasion.

SUMMARY OF THE INVENTION

An object of the present invention is to provide a run flat pneumatic radial tire having a low flatness and provided with a reinforcing liner layer having a crescent cross section, wherein the durability in run flat traveling has been improved.

Another object of the present invention is to provide a run flat pneumatic radial tire which can prevent occurrence of cracks accompanying flexing fatigue of an inner liner layer mainly composed of a butyl rubber disposed on the inside of a reinforcing liner layer having a crescent cross-section. A further object of the present invention is to provide a run flat pneumatic radial tire which can prevent an abrasion of an inner liner layer due to rubbing of the insides of the inner liner against each other during flexing thereof.

The run flat pneumatic radial tire of the present invention which can attain the above-described objects of the present invention is one having a flatness of 50% or less, comprising a reinforcing liner layer comprised of a high-hardness rubber having a crescent cross section disposed on the inside of a side wall portion in such a manner that the outer end portion and inner end portion of the reinforcing liner layer overlap with the end portion of a belt layer of a tread portion and with a bead filler of a bead portion, respectively, and an inner liner layer comprising a rubber composition mainly composed of a butyl rubber provided all over the internal surface of the tire, wherein the inside of the inner liner layer in a region covering at least said reinforcing liner layer is covered with a rubber layer comprising a rubber composition mainly composed of a diene rubber having a polybutadiene rubber content of 50% by weight or more based on the whole rubber component.

Thus, the covering of the inside of the inner liner layer at least a portion covering the reinforcing liner layer most frequently subject to flex straining with a rubber layer comprising a diene rubber mainly composed of polybutadiene rubber contributes to a further improvement in the durability in run flat traveling through the prevention of the occurrence of cracks accompanying the flex fatigue of the inner liner layer and abrasion due to rubbing of the insides of the inner liner layer against each other during flexing.

DETAILED DESCRIPTION OF THE PREFERRED EMBODIMENT

Figure 1:
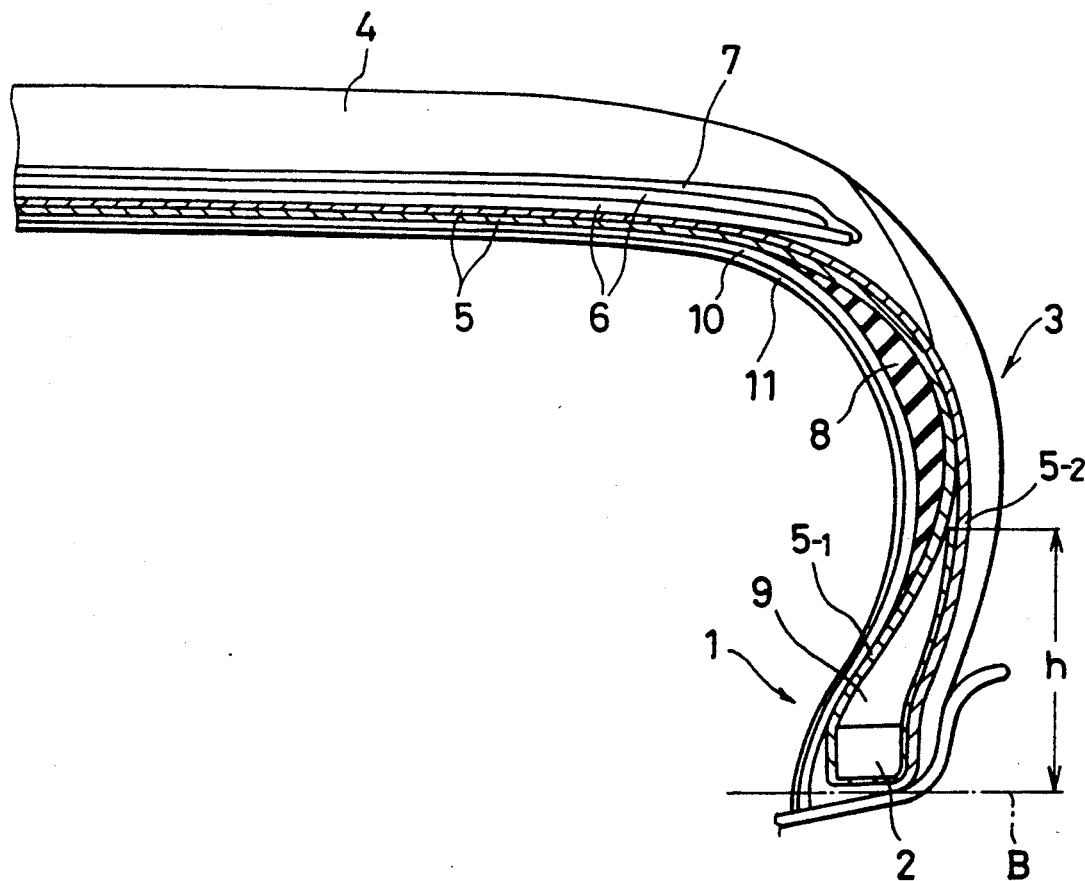
FIG. 1 is a semicross-sectional view of an embodiment of the tire of the present invention.

As shown in FIG. the tire of the present invention comprises a bead portion 1, a pair of left and right side wall portions 3 contiguous to the bead portion 1 and a tread portion 4 located between the side wall portions 3 and extending towards the circumferential direction of the tire, and has a flatness of 50% or less in terms of the ratio of the maximum width of the cross-section of the tire and the height of the cross-section of the tire.

A carcass layer 5 comprises two layers of an inner carcass layer 5-1 and an outer carcass layer 5-2 each comprising cords substantially orthogonal to the circumferential direction of the tire. The inner carcass layer 5-1 at both of its ends is folded back around a bead core 2 provided in the bead portion 1 from the inside of the tire towards the outside of the tire so as to enfold a bead filler 9 therein, while the outer carcass layer 5-2 extends down to a position axially outside of the bead core 2. The folded-back end of the inner carcass layer 5-1 is sandwiched between a portion of the body of the carcass layer 5-1 located before the folded-back portion and the outer carcass layer 5-2. A belt layer 6 comprising two layers crossing each other at a cord angle of 10° to 30° to the circumferential direction of the tire is provided on the carcass layer 5 in the tread portion 4. A belt cover layer 7 is provided on the belt layer 6.

In the side wall portion 3, a reinforcing liner 8 having a crescent cross section is provided on the inside of the inner carcass layer 5-1. The outer end in the radial direction overlaps with the lower end of the end portion of the belt layer 6, while the inner end in the radial direction overlaps with the bead filler 9. An inner liner layer 10 mainly composed of a butyl rubber is provided all over the whole surface of the inside of the tire. The inside of the inner liner layer 10 is covered with a rubber layer 11 comprising a rubber composition mainly composed of a diene rubber having a polybutadiene rubber content of 50% by weight or more based on the rubber component.

The whole surface of the inside of the inner liner layer as shown in the drawing may not necessarily be covered with the rubber layer, and the covering of at least a region corresponding to the reinforcing liner layer with the rubber layer is sufficient. The covering with the rubber layer contributes to a reduction in the occurrence of cracks by virtue of the flex fatigue resistance and, at the same time, prevents the abrasion of the inner liner layer due to the rubbing of the insides of the inner liner layer against each other.

Thus, the rubber layer 11 for covering the inner liner layer should comprise a rubber composition having a polybutadiene rubber content of 50% by weight or more based on the rubber component. When the content of the polybutadiene in the rubber component is less than 50% by weight, the flex fatigue resistance of the inner liner layer covered by the above rubber layer 11 cannot be sufficiently improved.

Specific examples of the rubber composition constituting the above-described rubber layer include a rubber composition comprising 50% by weight or more, preferably 55 to 70% by weight, based on the rubber component, of a polybutadiene rubber and 30 to 45% by weight, based on the rubber component, of a natural rubber. If necessary, the rubber component in the rubber composition may contain 15% by weight or less of a styrene-butadiene copolymer rubber (hereinafter abbreviated to "SBR").

The thickness of the rubber layer is preferably 0.3 to 1.5 mm. The effect of preventing the occurrence of cracks due to the flex fatigue of the inner liner layer can be enhanced by setting the thickness to 0.3 mm or more. The tire failure caused by the heat build-up of the tire can be prevented by setting the thickness to 1.5 mm or less.

In the present invention, the reinforcing liner layer provided on the inside of the side wall portion has such a crescent shape that the thickness of the cross section is maximum at the center portion and gradually reduced upward and downward in the radial direction. Further, in the crescent cross section, one end portion overlaps with the end portion of the belt layer, while the other end portion overlaps with the bead filler.

The reinforcing liner layer comprises a high hardness rubber. A complex modulus, $E^*_{20}$, of the rubber is preferably 16 MPa or more at 20° C. It is preferred to maintain the above-described level of the dynamic modulus of elasticity not only at 20° C. but also when the temperature is raised to 100° C. or above during travelling. Therefore, the rubber is preferably one having such a property that the ratio of the complex modulus at 100° C., $E^*_{100}$, to the complex modulus at 20° C., $E^*_{20}$, i.e., $E^*_{100}/E^*_{20}$, is 0.80 or more.

Further, in the above-described rubber of the reinforcing liner layer, the 100% modulus is preferably 60 kg/cm² or more. The high rigidity thus attained enables the breaking of the tire during run flat traveling to be prevented. The loss tangent (hereinafter referred to as "tan δ") at 100° C. is preferably 0.35 or less. This serves to suppress the heat build-up during flexing.

In the present invention, the above-described complex moduli, $E^*_{20}$ and $E^*_{100}$, and tan δ are values measured by making use of "Rheolographsolid" manufactured by Toyo Seiki Co., Ltd. at 20° C. and 100° C. under conditions of an initial strain of 5%, a dynamic strain of 1% and a frequency of 20 Hz.

It is preferred that the maximum thickness of the reinforcing liner layer having a crescent cross section be increased with an increase in the weight of the vehicle. However, when the thickness gauge is excessively large, the rigidity thereby becomes so high that the heat build-up becomes large and thereby the tire failure is caused. This lowers general traveling properties of the tire. For this reason, the maximum thickness of the reinforcing liner layer is preferably 3 or 8 mm.

In the present invention, it is preferred that the bead filler have a hardness of 60 to 80 in terms of the JIS-A hardness, comprise a rubber having a hardness lower than that of the reinforcing liner layer, and have a height, h, of 35 mm or less in a direction perpendicular to the axis of rotation from the rim base B. The above-described hardness and the height, h, of the bead filler serve to deform the side wall portion smoothly through a decrease in the local strain and, at the same time, to improve the general traveling performance, such as driving stability of the radial tire.

Figure 2:
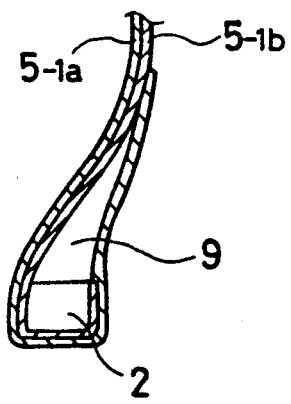
FIG. 2 is a cross-sectional view of another embodiment of the tire of the present invention.

In the tire of the present invention, the carcass layers preferably have the following structure. More specifically, as shown in FIG. 1, it is preferred that the inner carcass layer 5-1 be folded back around the bead core 2 from the inside to the outside of the tire so that the end of the inner carcass layer is higher than the height, h, of the bead filler 9 and sandwiched between a portion of the body of the carcass layer 5-1 located before the folded-back portion and the outer carcass layer 5-2 which extends down to a position axially outside of the bead core 2. Alternatively, as shown in FIG. 2, both of two carcass layers, 5-1a and 5-1b, may be folded back and wound up around the bead core 2 from the inside to the outside of the tire, and the end of one carcass layer 5-1b is provided around the bead core 2 while the end of the other carcass layer 5-1a may be wound up beyond the upper end of the bead filler 9. Furthermore, when the carcass layer comprises one layer, the carcass layer may be folded back and wound up around the bead core 2 from the inside to the outside of the tire, and the end of the carcass layer is wound up beyond the upper end of the base filler 9. The tire provided with a carcass layer having a structure shown in FIG. 1 is superior from the viewpoint of the durability in run flat traveling. The above-described structure of the carcass layer in a combination with the reinforcing liner layer exhibits a synergistic action on the suppression of the flexture and local strain, which enables the side wall portion to be smoothly deformed, so that the durability in run flat traveling is remarkably improved.

As described above, according to the present invention, the durability in run flat traveling can be remarkably improved by a run flat pneumatic radial tire having a flatness of 50% or less, comprising a reinforcing liner layer comprised of a high-hardness rubber having a crescent cross section disposed on the inside of a side wall portion and an inner liner layer comprising a rubber composition mainly composed of a butyl rubber provided all over the internal surface of the tire, wherein the inside of the inner liner layer in at least a region covering the reinforcing liner layer is covered with a rubber layer comprising a rubber composition mainly composed of a diene rubber having a polybutadiene rubber content of 50% by weight or more based on the whole rubber component.

EXAMPLE

There were prepared tires 1 and 2 of the present invention and comparative tires 1, 2 and 3 having the same size, i.e., 255/40R17, the same structure shown in FIG. 1 and the same belt layer, belt cover layer, carcass layer, reinforcing liner layer, bead filler and inner liner layer as given in the following specifications with variation in only the rubber layer of the inside of the inner liner layer as shown in Table 3, and comparative tire 4 provided with no rubber layer.

These tires were subjected to evaluation of the durability in run flat traveling as follows. The results are given in Table 3.

Tire specifications belt layer: a layer comprising steel cords having crossing angle of 24° and a covering rubber
belt cover layer: a layer comprising nylon cords having a cord angle of substantially 0° to the circumferential direction of the tire and a covering rubber
carcass layer: a layer comprising rayon cords having a cord angle of substantially 90° to the circumferential direction of the tire
reinforcing liner layer: a layer comprising a rubber composition according to the formulation of ingredients given in Table 1 and having a maximum thickness of 5 mm
bead filler: a layer comprising a rubber composition according to the formulation of ingredients given in Table 2 and having a JIS-A hardness of 75° and a height, h, of 33 mm
inner liner layer: a layer comprising a rubber composition mainly composed of a butyl rubber and having a thickness of 1 mm Durability in run flat traveling The durability in run flat traveling is a value determined by mounting a test tire having a pneumatic pressure of 0 kg cm$^2$ on a vehicle wherein a load of 500 kg per tire is applied in such a manner that the tire does not come off a rim, travelling the vehicle and measuring a distance traveled till the tire breaks. The measured value was expressed in terms of an index by assuming the value of the comparative tire 4 as 100. The larger the index, the better the durability in run flat traveling.

TABLE 1

| Formulation of Ingredients | | |
|---|---|---|
| | natural rubber (TSR) | 40.00 pts. wt. |
| | polybutadiene rubber ("Nipol 1220"[1]) | 60.00 pts. wt. |
| | zinc oxide | 5.00 pts. wt. |
| | stearic acid | 1.50 pts. wt. |
| | antioxidant (6C) | 1.00 pts. wt. |
| | resin[2] | 8.00 pts. wt. |
| | carbon black (LS-HAF) | 65.00 pts. wt. |
| | insoluble sulfur[3] | 7.50 pts. wt. |
| | vulcanization | 1.20 pts. wt. |

TABLE 1-continued

| Properties | | |
|---|---|---|
| | $E^*_{20}$ | 17.4 MPa |
| | $E^*_{100}$ | 14.7 MPa |
| | $E^*_{100}/E^*_{20}$ | 0.86 |
| | 100% modulus | 65 kg/cm$^2$ |
| | tan δ (100° C.) | 0.28 |
| | JIS-A hardness | 78 |

TABLE 2

| natural rubber (SIR) 20) | 60.00 pts. wt. |
|---|---|
| styrene-butadiene (copolymer) rubber ("Nipol 1502)[4] | 30.00 pts. wt. |
| zinc oxide | 5.00 pts. wt. |
| stearic acid | 2.00 pts. wt. |
| antioxidant (6C) | 1.00 pts. wt. |
| aromatic oil | 7.00 pts. wt. |
| carbon black (LS-HAF) | 70.00 pts. wt. |
| insoluble sulfur[3] | 3.00 pts. wt. |
| vulcanization accelerator | 1.00 pts. wt. |

TABLE 3

| | | Tire 1 of the present invention | Tire 2 of the present invention | Comparative tire 1 | Comparative tire 2 | Comparative tire 3 | Comparative tire 4 |
|---|---|---|---|---|---|---|---|
| formulation of ingredients | natural rubber (RSS#3) | 45.0 | 30.0 | 55.0 | 40.0 | 60.0 | — |
| | polybutadiene ("Nipol 1220"[1]) | 55.0 | 60.0 | 45.0 | — | 40.0 | — |
| | styrene-butadiene (copolymer) rubber ("Nipol 1502"[4]) | — | 10.0 | — | — | — | — |
| | brominated butyl rubber[5] | — | — | — | 40.0 | — | — |
| | EPT (ESPRENE 505A)[6] | — | — | — | 20.0 | — | — |
| | carbon black (FEF) | 50.0 | 30.0 | 50.0 | 40.0 | 40.0 | — |
| | naphthanic oil | 8.0 | 8.0 | 8.0 | 9.0 | 5.0 | — |
| | vulcanization accelerator | 0.8 | 0.8 | 0.8 | 0.5 | 0.6 | — |
| | sulfur | 1.8 | 1.8 | 1.8 | 1.2 | 1.4 | — |
| thickness of rubber layer (mm) | | 0.8 | 0.8 | 0.8 | 0.8 | 0.8 | — |
| durability in run flat traveling | | 132 | 125 | 108 | 105 | 102 | 100 |

In the Table 3, the values on individual formulation of ingredients are parts by weight.

In Tables 1 to 3, [1] is a product of Nippon Zeon Co., Ltd., [2] is a m-cresol formaldehyde resin, [3] contains 20% of an oil extender, and [4] is a product of Nippon Zeon Co., Ltd. [5] is a product "POLYSAR Bromo Butyl×2" of POLYSAR Co., Ltd. [6] is a product of SUMITOMO CHEMICAL INDUSTRIES Co., Ltd.

From Table 3, it is apparent that both tire 1 of the present invention and tire 2 of the present invention wherein the respective rubber layers provided on the inside of the inner liner layer comprise diene rubber compositions having polybutadiene contents of 55% by weight and 60% by weight based on the rubber component exhibit a remarkable improvement in the durability in run flat traveling over comparative tire 4. Further, Table 3 shows that no sufficient improvement in the durability in run flat traveling can be attained in comparative tires 1 and 3 wherein the polybutadiene rubber content is less than 50% by weight even when the inner liner layer is covered with a rubber layer as well as in comparative tire 2 wherein no polybutadiene rubber is incorporated.

What is claimed is:

1. A run flat pneumatic radial tire having a flatness of 50% or less, comprising a reinforcing liner layer comprised of a high-hardness rubber having a crescent cross section disposed on the inside of a side wall portion in such a manner that the outer end portion and inner end portion of the reinforcing liner layer overlap with the end portion of a belt layer of a tread portion and with a bead filler of a bead portion, respectively, and an inner liner layer comprising a rubber composition mainly composed of a butyl rubber provided all over the inner surface of the tire, wherein the inside of the inner liner layer in at least a region covering the reinforcing liner layer is covered with a rubber layer comprising a rubber composition having a polybutadiene rubber content of 50% by weight or more based on the rubber component.

2. A run flat pneumatic radial tire according to claim 1, wherein the whole inner surface of the inner liner layer is covered with the rubber layer.

3. A run flat pneumatic radial tire according to claim 1, wherein the rubber layer comprises a rubber composition comprised of 55 to 70% by weight, based on the rubber component, of polybutadiene rubber and 30 to 45% by weight, based on the rubber component, of natural rubber.

4. A run flat pneumatic radial tire according to claim 3, wherein the rubber component contains 15% by weight or less of a styrene-butadiene copolymer rubber.

5. A run flat pneumatic radial tire according to claim 1, wherein the thickness of the rubber layer is 0.3 to 1.5 mm.

6. A run flat pneumatic radial tire according to claim 1, wherein the rubber composition constituting the reinforcing liner layer has a 100% modulus of 60 kg/cm$^2$ or more and a loss tangent (tan $\delta$) of 0.35 or less at 100° C. measured under conditions of an initial strain of 5%, a dynamic strain of 1% and a frequency of 20 Hz.

7. A run flat pneumatic radial tire according to claim 1, wherein the rubber composition constituting the reinforcing liner layer has a complex modulus at 20° C. ($E^*_{20}$) of 16 MPa or more and the ratio of a complex modulus at 100° C. ($E^*_{100}$) to the complex modulus at 20° C. ($E^*_{20}$) is 0.80 or more, the complex moduli being measured under conditions of an initial strain of 5%, a dynamic strain of 1% and a frequency of 20 Hz.

8. A-run flat pneumatic radial tire according to claim 7, wherein the maximum thickness gauge of the reinforcing liner layer is 3 to b 8 mm.

9. A run flat pneumatic radial tire according to claim 1, wherein the rubber composition constituting the bead filler has a JIS-A hardness of 60 to 80, a hardness lower than the rubber hardness of the reinforcing liner layer and a height, h, of 35 mm or less in a direction perpendicular to the axis of rotation from the rim base B.

10. A run flat pneumatic radial tire according to claim 1, wherein the carcass layer is comprised of an inner carcass layer and an outer carcass layer, the inner carcass layer being folded back around a bead core to such a position that the folded back end is higher than the height, h, of the bead filler, the outer carcass layer extends down to a position axially outside of the bead core, and the folded back end of the inner carcass layer is sandwiched between a portion of the inner carcass layer and the outer carcass layer.

* * * * *